United States Patent
Baker et al.

(10) Patent No.: US 10,266,334 B2
(45) Date of Patent: Apr. 23, 2019

(54) BARRIER PACKAGE AEROSOL CONTAINER AND PISTON FOR THE SAME

(71) Applicant: Clayton Corporation, Fenton, MO (US)

(72) Inventors: Mark Baker, St. Louis, MO (US); Kevin R. Martz, Desoto, MO (US)

(73) Assignee: Clayton Corporation, Fenton, MO (US)

( * ) Notice: Subject to any disclaimer, the term of this patent is extended or adjusted under 35 U.S.C. 154(b) by 0 days.

(21) Appl. No.: 15/600,240

(22) Filed: May 19, 2017

(65) Prior Publication Data
US 2017/0334633 A1    Nov. 23, 2017

Related U.S. Application Data

(60) Provisional application No. 62/338,980, filed on May 19, 2016.

(51) Int. Cl.
| | |
|---|---|
| *B65D 83/64* | (2006.01) |
| *B65D 83/14* | (2006.01) |
| *F16J 1/00* | (2006.01) |
| *F16J 15/3204* | (2016.01) |
| *B65D 83/46* | (2006.01) |

(52) U.S. Cl.
CPC ............. *B65D 83/64* (2013.01); *B65D 83/14* (2013.01); *B65D 83/46* (2013.01); *F16J 1/003* (2013.01); *F16J 15/3204* (2013.01)

(58) Field of Classification Search
CPC . B65D 83/64; B65D 83/14; F16J 1/003; F16J 15/3204
See application file for complete search history.

(56) References Cited

U.S. PATENT DOCUMENTS

| | | | |
|---|---|---|---|
| 4,234,108 A | 11/1980 | Diamond | |
| 4,355,736 A * | 10/1982 | Schumacker | B65D 83/64 222/386.5 |
| 4,913,323 A | 4/1990 | Scheindel | |
| 6,386,400 B1 * | 5/2002 | Scheindel | B65D 83/46 222/387 |
| 7,261,225 B2 | 8/2007 | Rueschhoff et al. | |

(Continued)

OTHER PUBLICATIONS

International Search Report of related application PCT/IB2017/052982 dated Aug. 4, 2017, 3 pgs.

(Continued)

*Primary Examiner* — Donnell Long
(74) *Attorney, Agent, or Firm* — Stinson Leonard Street LLP

(57) ABSTRACT

A barrier package aerosol container includes a can, valve, and piston disposed in the interior volume of the can. The piston is movable toward a top end of the can to facilitate dispensing of flowable material in the can. Opposing surfaces of the piston and the can and the valve define an interstitial space of the interior volume in which the flowable product is receivable. The piston is contacts at least one of the interior surface of the can at its top end and the valve, to define a piston interface when the piston is at the top end of the can during use. At least one of the piston, the can, and the valve defines one or more flow passages at the piston interface to allow flowable material in the interstitial space to flow through the piston interface toward the valve inlet during use.

20 Claims, 16 Drawing Sheets

(56) References Cited

U.S. PATENT DOCUMENTS

| | | | |
|---|---|---|---|
| 2002/0027146 A1 | 3/2002 | de LaForcade et al. | |
| 2002/0030067 A1* | 3/2002 | Frutin | B65D 83/201 |
| | | | 222/389 |
| 2007/0287965 A1* | 12/2007 | Strong | B05C 17/00576 |
| | | | 604/218 |
| 2016/0280449 A1* | 9/2016 | Mekata | B65D 81/325 |

OTHER PUBLICATIONS

Written Opinion of related application PCT/IB2017/052982 dated Aug. 4, 2017, 4 pgs.

* cited by examiner

FIG. 3
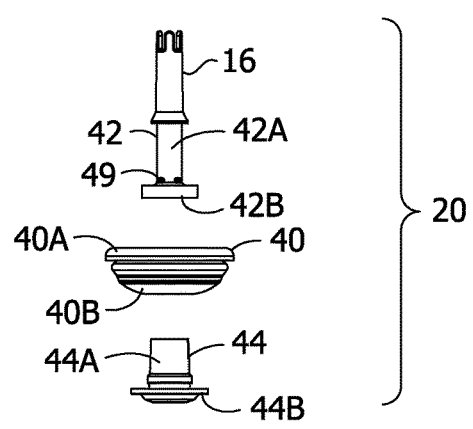
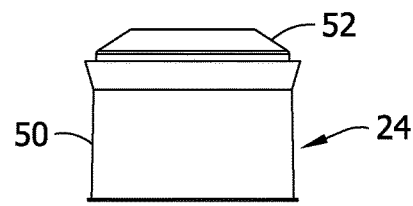
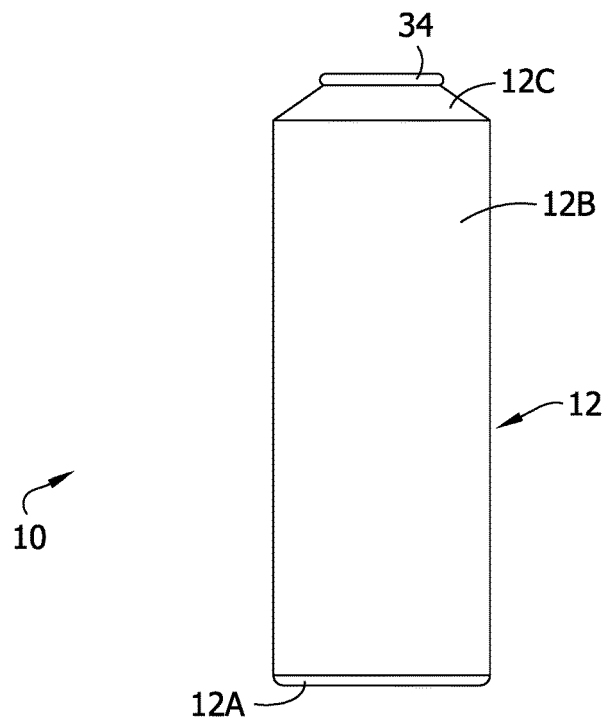

US 10,266,334 B2

BARRIER PACKAGE AEROSOL CONTAINER AND PISTON FOR THE SAME

CROSS-REFERENCE TO RELATED APPLICATION

The present application claims the benefit of U.S. Provisional Application Ser. No. 62/338,980, filed May 19, 2016, the entirety of which is hereby incorporated by reference.

BACKGROUND

Barrier package aerosol containers ("BPA containers") are used to dispense flowable materials such as processed cheese, frosting, shaving cream, pesticides, paint, and the like. In general, an aerosol container can include a can that contains a flowable product and a propellant. A valve is mounted on one end of the can and is configured to be selectively opened to allow the propellant to drive the flowable product out of the can. In some aerosol containers a piston in the can is used to separates the propellant from the flowable product. The piston moves distally toward the valve as the flowable material is dispensed.

SUMMARY

In one aspect, a barrier package aerosol container for dispensing a flowable product generally comprises a can having opposite top and bottom ends and an interior surface defining an interior volume. A valve is secured to the top end of the can. The valve defines a valve inlet that is selectively openable to dispense the flowable product from the can. A piston is disposed in the interior volume of the can. The piston is movable toward the top end of the can to facilitate dispensing of the flowable material. Opposing surfaces of the piston and the can and the valve define an interstitial space of the interior volume in which the flowable product is receivable. The piston is configured to contact at least one of the interior surface of the can at its top end and the valve, to define a piston interface when the piston is at the top end of the can during use. At least one of the piston, the can, and the valve defines one or more flow passages at the piston interface to allow flowable material in the interstitial space to flow through the piston interface toward the valve inlet during use.

In another aspect, a piston for a barrier package aerosol container comprises a piston body sized and shaped to be slidably received in a can of the barrier package aerosol container. The piston body has a generally conical shaped distal end having a distal surface configured to generally nest with a top end of the can and a valve of the barrier package aerosol container. At least one fluid passage on the distal surface of the piston body configured to allow flowable material in an interstitial space to flow therethrough toward an inlet of the valve during use.

BRIEF DESCRIPTION OF THE DRAWINGS

FIG. 3 an exploded perspective of the BPA container.

Corresponding reference characters indicate corresponding parts throughout the drawings.

DETAILED DESCRIPTION

Typically, a barrier package aerosol (BPA) container is not capable of dispensing the entire amount of flowable product within the container. This is due, at least in part, to the fact that a vacuum pressure at the valve opening can cause the piston to deform and contact the container or valve at an interface and form a seal at the interface. The seal inhibits residual material located in an interstitial space between the piston and the container and/or valve from flowing toward the opening in the valve. In other words, the seal inhibits fluid communication between the flowable product in at least a portion of the interstitial space and an inlet of the valve, thereby trapping residual flowable product in the container. The exact location of this interface seal can vary from BPA container to BPA container, which causes variation in the total amount of flowable product that is dispensed from BPA containers of the same type. Certain regulatory bodies have strict weights and measures regulations that require that every BPA container of a particular type dispense a predetermined minimum amount of the flowable product. Because of the potential for variation from one BPA container to the next, producers of the flowable product typically overfill with product to ensure compliance with these regulations.

Figure 1:
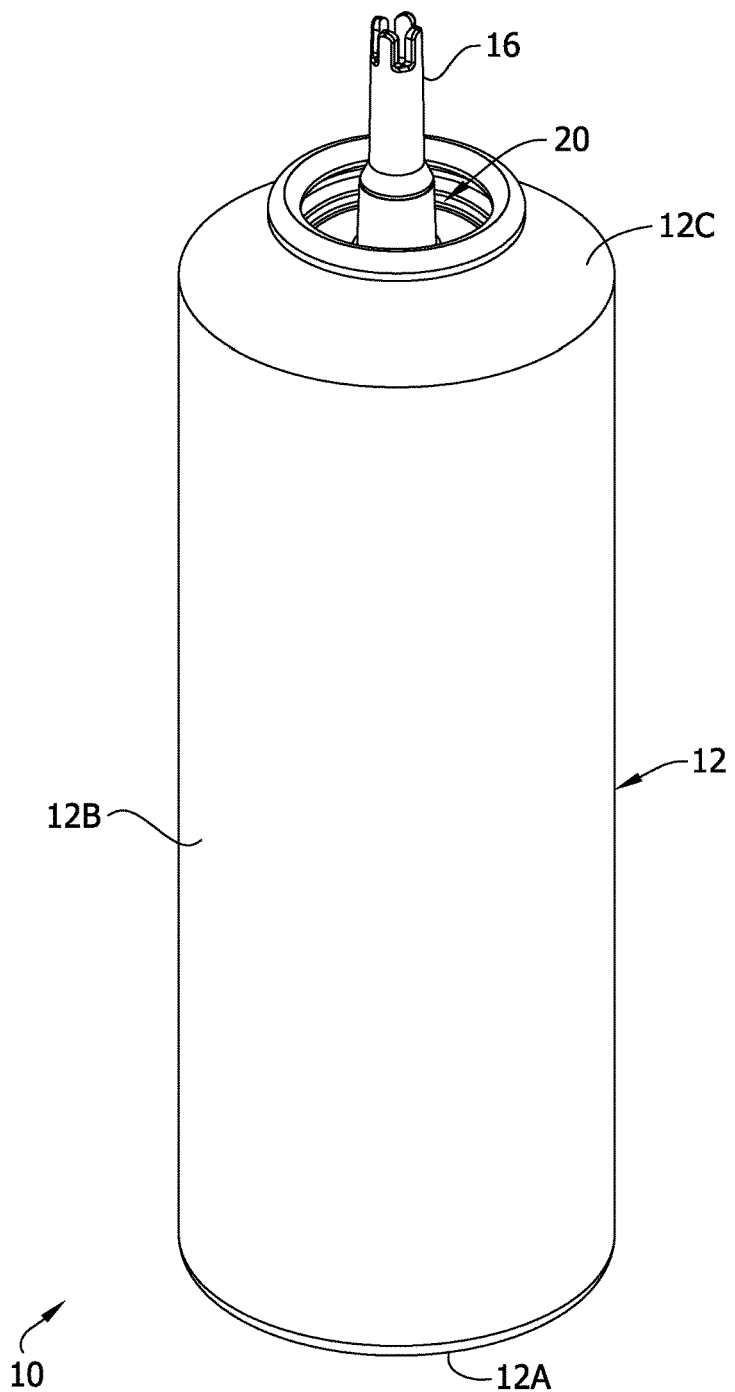
FIG. 1 is perspective of a BPA container.
Figure 2:
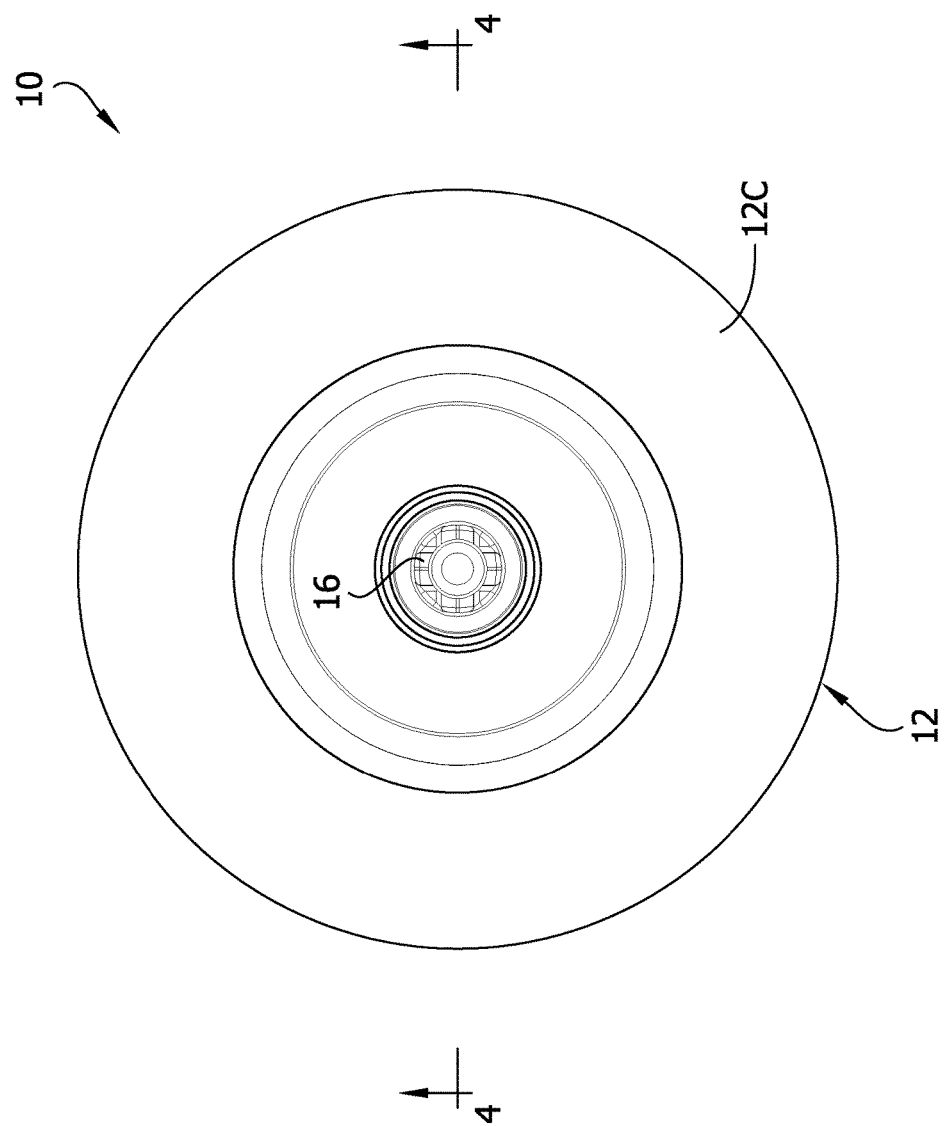
FIG. 2 is a top plan view of the BPA container.

Referring now to the drawings, and in particular to FIGS. 1 and 2, a BPA container is generally indicated at 10. The BPA container 10 is configured to store and dispense a flowable product (e.g., processed cheese, frosting, shaving cream, pesticides, paint, and the like) using propellant (e.g., nitrous oxide). It will be understood that other various propellants and flowable products may be used. The illustrated BPA container 10 includes a can (broadly, a container or vessel), generally indicated at 12, and a nozzle 16. The nozzle 16 functions as an actuation mechanism that is configured to selectively actuate a valve, generally indicated at 20, as shown in FIGS. 3-5A. When actuated by the nozzle 16, the valve 20 opens to define an outlet of the BPA container 10 that fluidly couples an interior volume 22 of the can 12 to the nozzle 16. A piston 24 is slidably received in the can 12 and divides the interior volume 22 into a distal portion and a proximal portion, relative to the bottom end of the can. The flowable product is received in the distal portion of the interior volume 22, and propellant is received in the proximal portion. When the valve 20 opens, the propellant drives the piston 24 distally in a dispensing direction DD (FIG. 4; except the valve is not shown open) to dispense the flowable product through the nozzle 16. The piston 24 is shaped and arranged to generally correspond in size and shape to the portions of the can 12 and the valve 20 that define a distal end of the interior volume 22. As explained below and shown in FIG. 5, when the piston 24 reaches the distalmost position within the interior volume, it contacts the portions of the can 12 and the valve 22 that define the distal end of the interior volume 22 to form a piston interface. In the illustrated embodiments, at least one of the piston 24, the can 12, and the valve 20 are shaped and arranged to define one or more product flow passages at the piston interface (i.e., the location where the piston and at least one of the can and the valve will meet when the piston is at the distal end of the interior volume 22 of the can).

Figure 4:
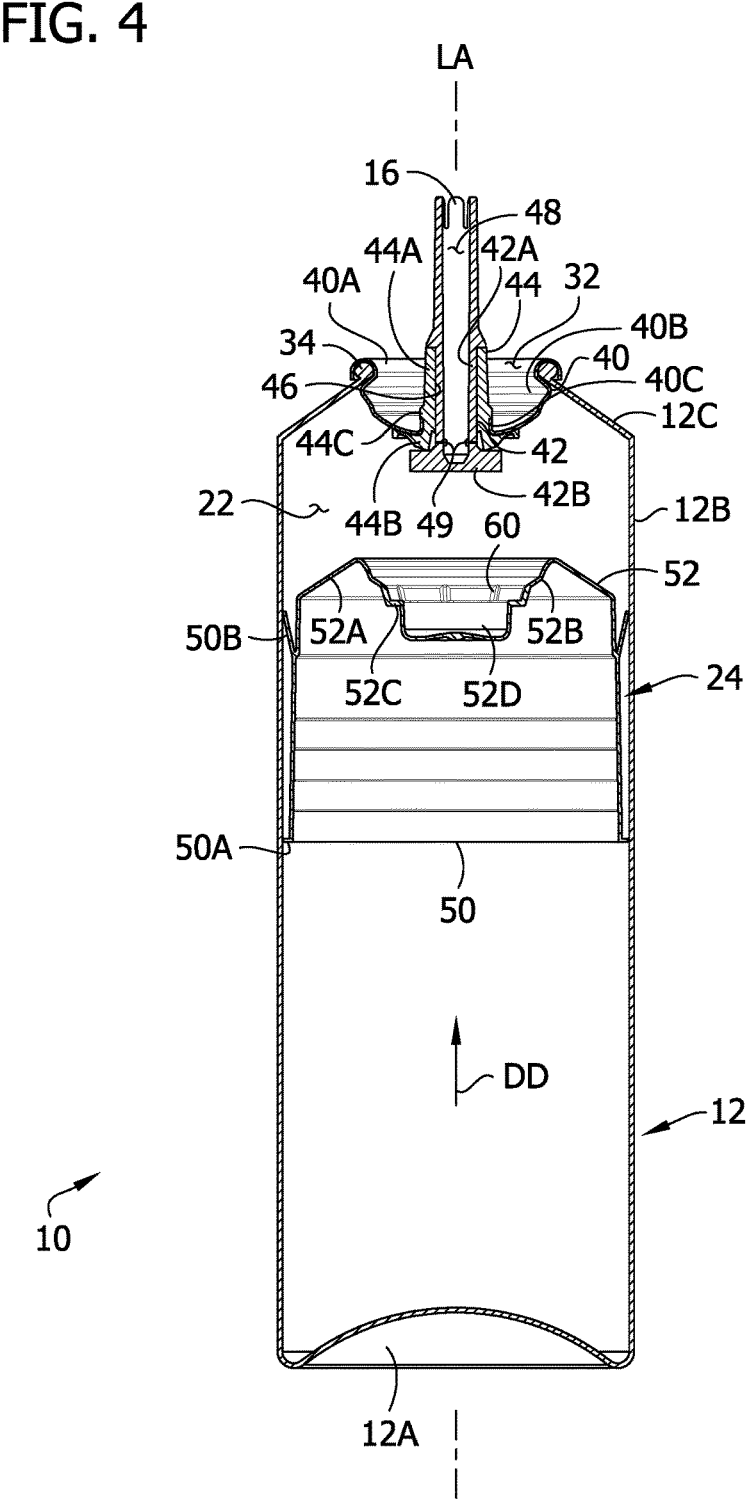
FIG. 4 is a cross section taken in the plane of line 4-4 of FIG. 2.

Referring to FIGS. 3 and 4, the can 12 includes a base 12A, a cylindrical wall 12B, and conical end cap 12C that defines an opening 32 spaced apart from the base of the can along a longitudinal axis LA of the BPA container 10. The base 12A, the cylindrical wall 12B, and the conical end cap 12C form a one-piece can 12 in the illustrated embodiment. In FIGS. 3 and 4, the base 12A defines the bottom end of the can 12, and the opening 32 and the conical end cap 12C are located at the top end. The relative positions of the base 12A and the opening 32 of the can 12 will vary in use. The top end of the can 12 has a rim 34 that extends circumferentially around the opening 32. Preferably, the rim 34 (commonly called a bead or curl) defines a structure for securing the valve 20 to the can 12. When the valve 20 is secured to the rim 34 and closed as shown in FIG. 4, the can 12 and the valve enclose the flowable product in the interior 22 of the can.

Figure 4A:
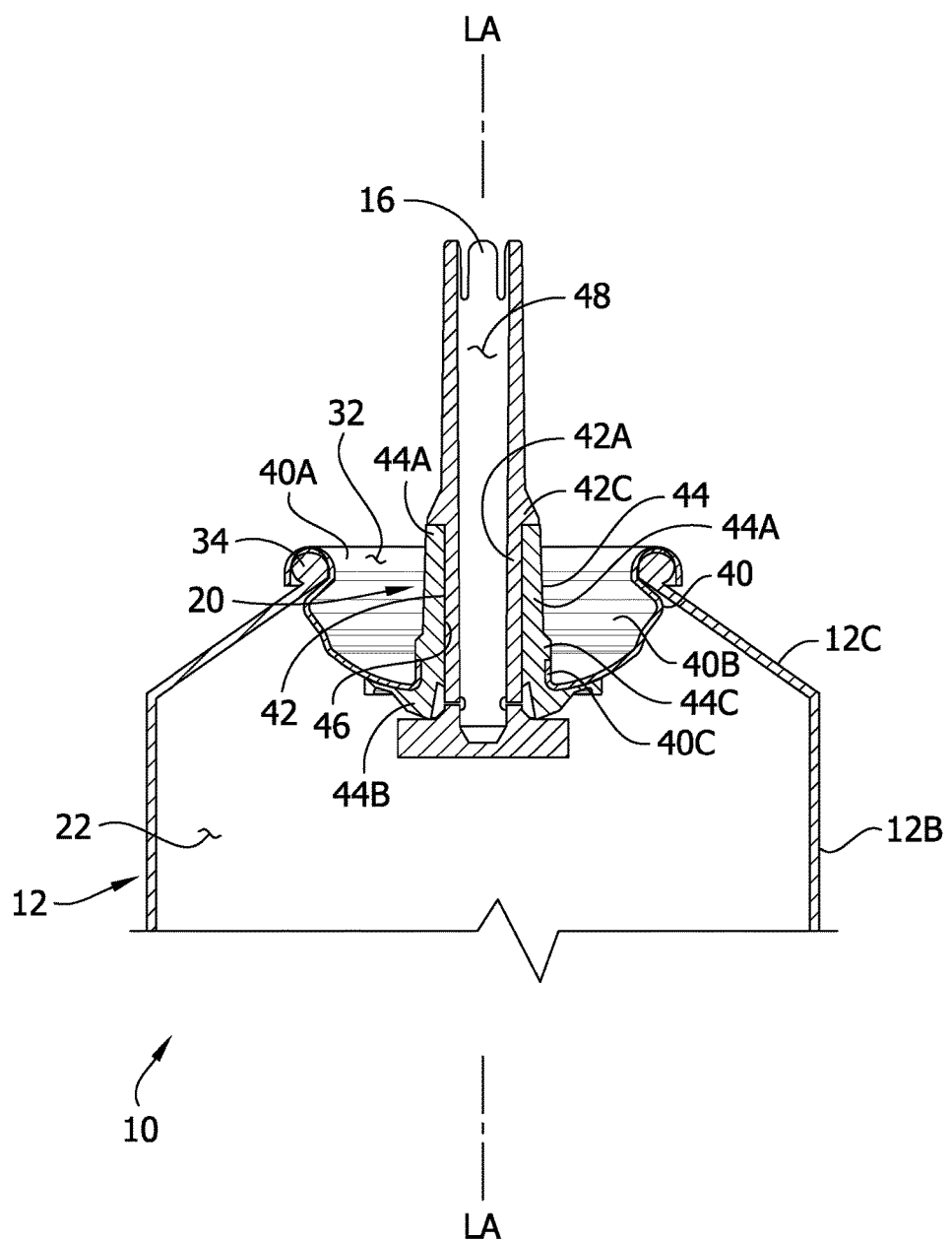
FIG. 4A is an enlarged view of a distal end portion of the BPA container as seen in FIG. 4.

Referring to FIGS. 4 and 4A, the valve 20 is a "tilt valve" (industry name for a valve that is actuated by tilting it to the side to open, but it may also be actuated by vertical depression). Any suitable tilt valve may be used. In addition, other types of valves (e.g., vertically actuated valves, also called spring valves or spray valves) may be used in other embodiments. The illustrated valve 20 includes a mounting cup 40, a stem (and in some types of valves, a rivet) 42 formed integrally with the nozzle 16, and a seal 44 (e.g., a grommet) disposed between and interconnecting the stem and mounting cup. The mounting cup 40 is an annular body that defines an outer lip portion 40A sized to curl around the rim 34 of the can 12. In a preferred embodiment, the mounting cup 40 is crimped (also called clinched) or otherwise fastened to the rim 34 to form a leak proof seal. A material (not shown), such as a lathe cut gasket or plastic laminate film, may be provided to form a leak proof seal between the valve and the can. A central portion 40B of the mounting cup 40 extends radially inward from the lower end of the lip portion 40A to an inner wall portion 40C. In the illustrated embodiment, the central portion 40B defines a concave depression, but it could have other shapes in other embodiments. As discussed below, the central portion 40B forms a seat for sealing engagement with a portion of the seal 44. The inner wall portion 40C extends generally upward from the inner end of the central portion 40B and defines a mounting opening in the cup 40.

The grommet 44 is preferably made of resilient material and, in a tilt style valve as used in this embodiment, has an elongate neck portion 44A that extends through the mounting opening of the cup 40 and a flange portion 44B that extends radially outward at the proximal end of the neck portion. A seal bead 44C extends radially outward from the neck portion 44A and overlies and presses against a top end of the inner wall portion 40C of the cup 40. The central portion 40B of the mounting cup 40 is thereby pressed against the flange portion 44B of the grommet 44 to form a leak proof seal. An axially extending bore 46 extends from a top end through a bottom end of the grommet 44 to receive the valve stem 42 therein.

The valve stem 42 includes an elongate stem body 42A and a disc 42B (or button) at the lower end of the stem body. The elongate stem body 42A defines a passage 48 in fluid communication with the nozzle 16. The stem body 42 fits through the bore 46, and the disc 42B seats against the flange portion 44B to form a leak proof seal when the valve 20 is in a non-actuated position, as shown in the drawings. A stem shoulder 42C extends radially outward from the elongate portion 42A to overlie and seal against the distal end of the grommet 44. As discussed in further detail below, when the valve 20 is actuated, the nozzle 16 imparts a bending moment on the neck portion 44A of the grommet 44 and the elongate portion 42A of the stem 42, which causes the disc portion 42B of the valve stem 42 to become unseated from the flange portion 44C of the grommet 44 to open the valve 20, thereby defining an inlet of the valve. When the valve 20 is open the flowable product flows between the disc portion 42B and the flange 44B. Openings 49 are formed in the elongate portion 42A of the stem 42 adjacent the disc portion 42B. When the valve 20 is open, therefore, the fluid flows through into the openings 49 and into the passage 48, out the nozzle 16. Thus, the open valve 20 defines an outlet of the container 10 that fluidly couples the vessel interior 22 to the nozzle 16. The product flows through the outlet and into the nozzle 16.

Figure 6:
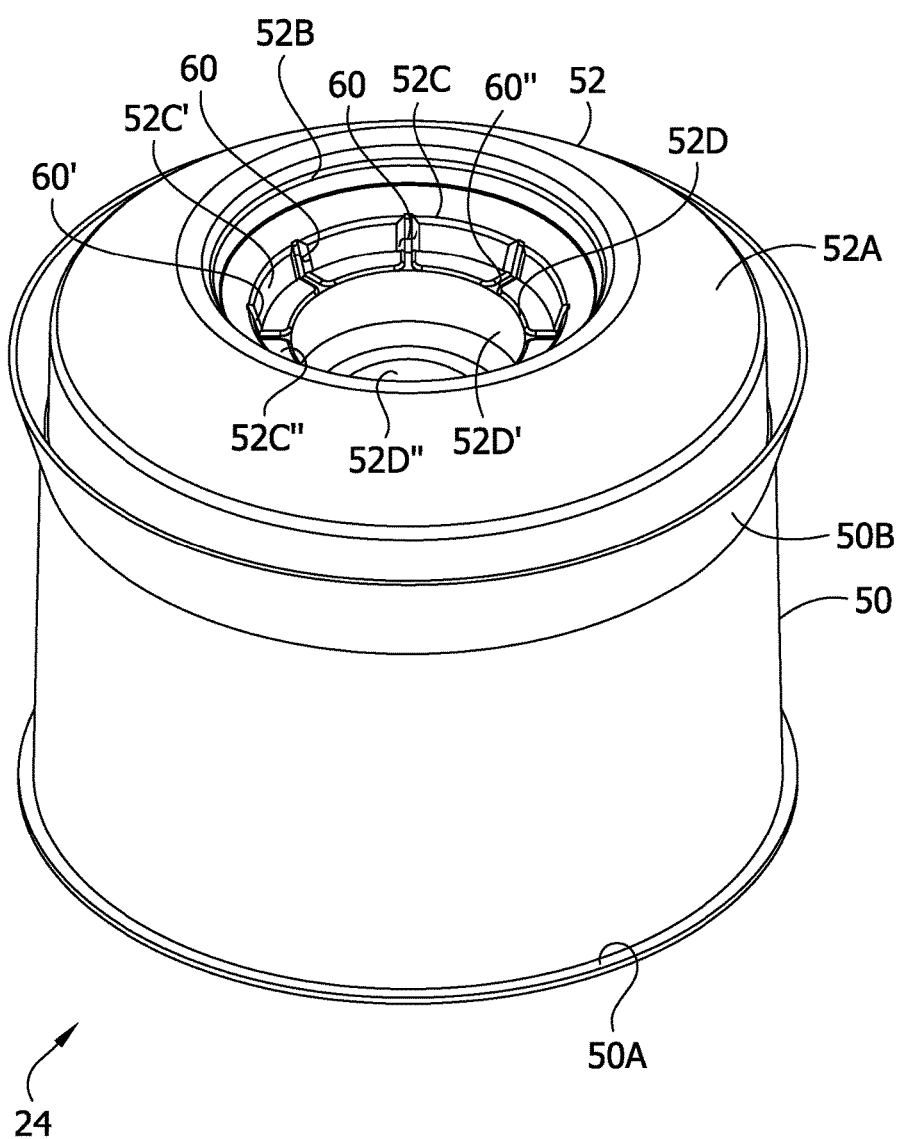
FIG. 6 is a perspective of the piston.
Figure 7:
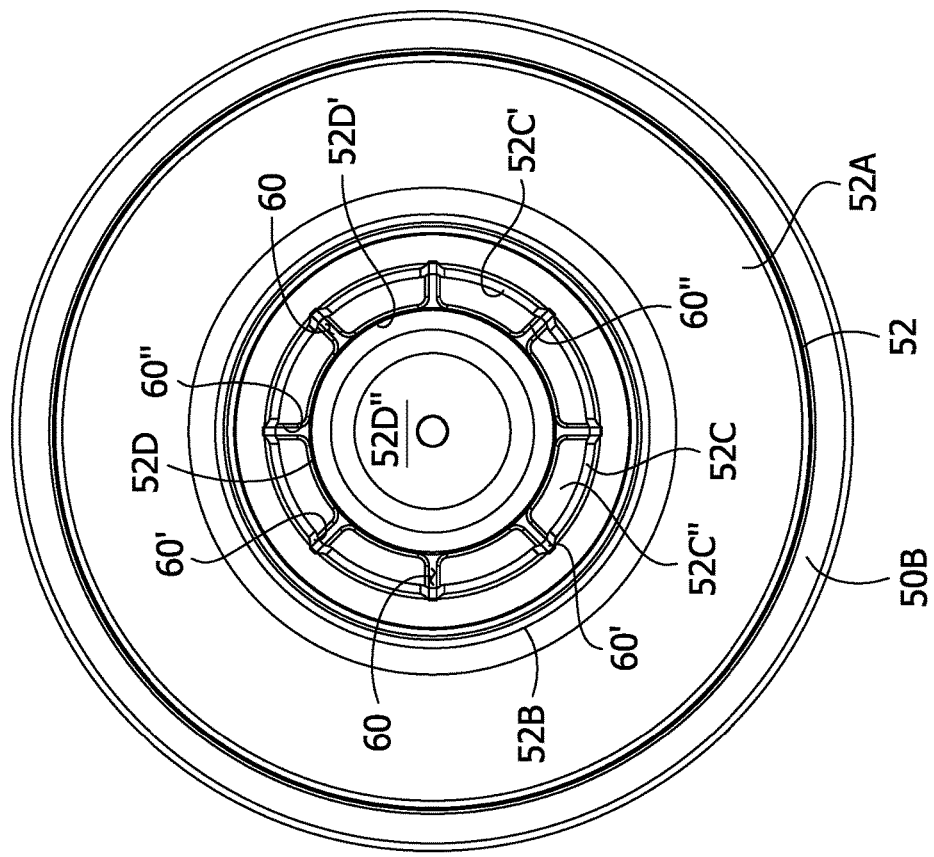
FIG. 7 is a top plan view of the piston.

When the valve 20 is opened, the propellant drives the piston 24 in the dispensing direction DD through the interior volume 22 to dispense the product. As shown in FIGS. 6 and 7, the piston 24 is sized and arranged to generally conform to the interior of the can 12. The piston 24 includes a proximal skirt 50 and a distal crown 52. The skirt 50 is generally cylindrical and has a diameter or cross-sectional dimension that tapers gradually as it extends from its proximal end to its distal end toward the crown 52. In the illustrated embodiment, a proximal flange 50A that is sized and arranged for slidably engaging the interior surface of the cylindrical wall 12B of the can 12 extends radially outward from adjacent the proximal end of the skirt 50. In the illustrated embodiment, a skewed distal flange 50B extends distally and radially outward from adjacent the distal end portion of the skirt 50. The distal flange 50B, shown in this embodiment, sealingly and slidably engages the interior surface of the cylindrical wall 12B to prevent product from entering the proximal portion of the interior volume 22 that contains the propellant. Other embodiments may not have a distal flange that prevents product form entering the proximal portion, but such sealing is instead accomplished by other means. The piston may include other structures without departing from the scope of the present disclosure.

Figure 5:
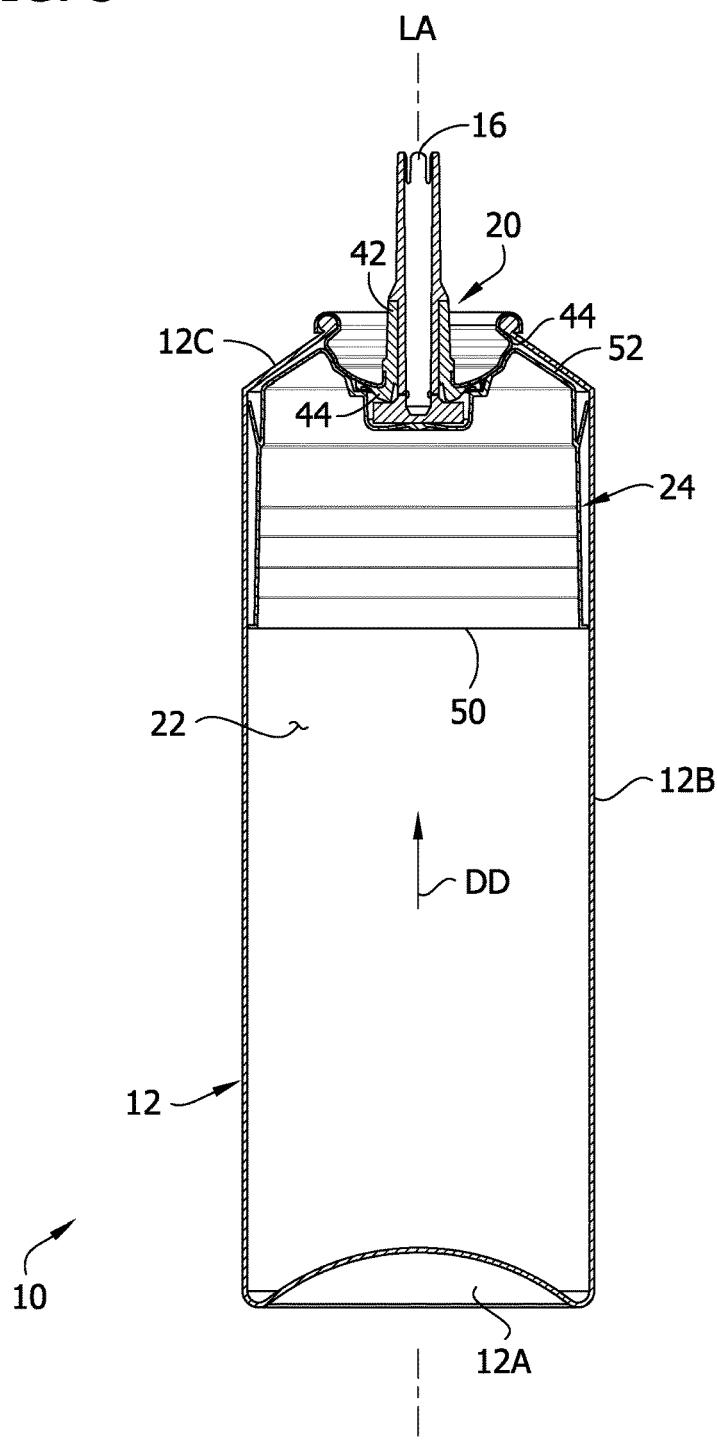
FIG. 5 is a cross section of the BPA container similar to FIG. 4, illustrating a piston of the BPA container in a distalmost position.
Figure 5A:
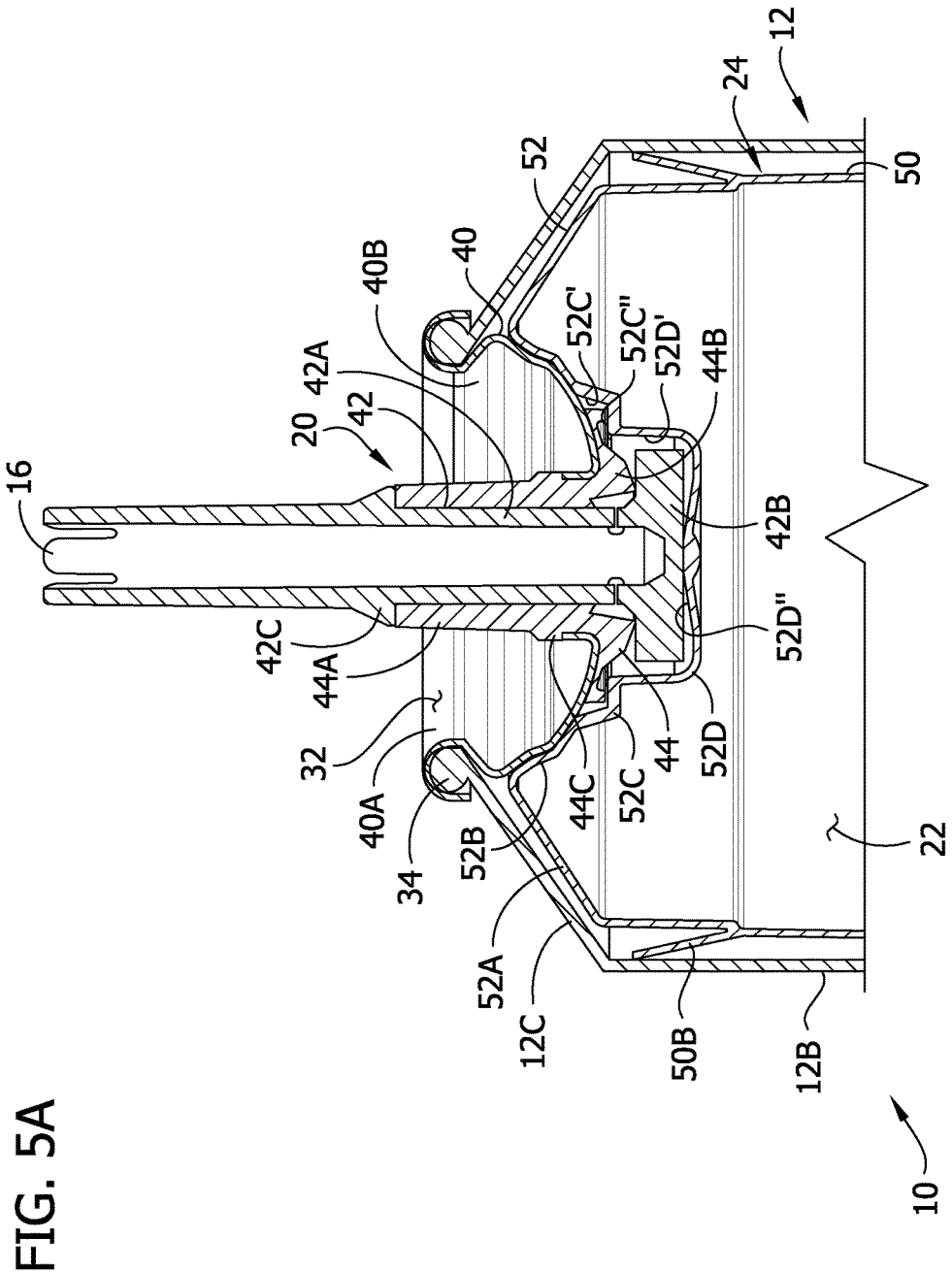
FIG. 5A is an enlarged view of the distal end portion of the BPA container as seen in FIG. 5.

As shown in FIGS. 5 and 5A, the crown 52 of the piston 24 is shaped and arranged to generally correspond to the shapes of the interior distal end of the BPA container 10

(e.g., the interior distal surface of the can 12 and the surface of the valve 20 received in the can). In other words, the shape of the crown 52 is "traced" to generally match the shape of the conical end cap 12C of the can 12, the central portion 40B of the mounting cup 40, the flange portion 44B of the grommet 44, and the disc portion 42B of the valve stem 42. When the crown 52 reaches the distalmost position within the interior volume 22, the crown fits against the interior distal end of the BPA container 10 in relatively close tolerance to reduce the size of any gaps between the piston 24 and the BPA container in an attempt to minimize the amount of residual product that remains in the can 12. It will be understood that, in other embodiments, the distal end of the BPA container may have other shapes and/or be defined by other components. In these embodiments, the crown of the piston may be shaped and arranged differently to generally correspond to the shape of the interior distal end of the BPA container.

Referring the FIGS. 5, 5A, 6 and 7, a shoulder or cap-opposing portion 52A of the crown 52 has a generally conical shape that extends distally and radially inward from the outer end of the crown to an inner end. The inner end of the shoulder portion 52A is located at about the same radial position as the distal and outer end of the central portion 40B of the mounting cup 40. The shoulder portion 52A of the crown 52 slopes proximally as it extends radially outward from its inner end at about the same angle as the conical end cap 12C of the can 12. When the piston 24 is in the distalmost position, the shoulder portion 52A and the piston substantially nest together. Suitably, the components of the BPA container 10 are sized an arranged so that only a very small amount of flowable product remains in the interstitial space between the shoulder portion 52A and the end cap 12C when the piston 24 reaches the distalmost position shown in FIGS. 5 and 5A. Moreover, this amount of flowable product is suitable substantially constant from BPA container to BPA container, when considering slight variations in dimensions from BPA container to BPA container due to manufacturing tolerances.

An annular cup-opposing portion 52B of the crown 52 extends proximally and radially inward form the inner end of the shoulder portion 52B. The cup-opposing portion 52B has a concave shape that generally corresponds to the shape of the segment of the central portion 40B of the mounting cup 40 that extends from the end cap 12C to the outer side of the flange portion 44B of the grommet 44. In the illustrated embodiment, a distal segment of the central portion 40B of the mounting cup 40 slopes inward at a first angle with respect to the longitudinal axis LA, an intermediate segment of the central portion slopes inward at a second angle that is steeper than the first angle, and a proximal segment of the central portion of the cup slopes inward at a third angle that is more gradual than either of the first and second angles. The cup-opposing portion 52B of the crown 52 likewise includes a distal segment that slopes inward at about the first angle, an intermediate segment that slopes inward at about the second angle, and a proximal segment that slopes inward at about the third angle. Thus, when the piston 24 is in the distalmost position, the cup-opposing portion 52B opposingly engages the central portion 40B of the mounting cup 40 to define a substantially continuous and uniform surface. To the extent that a small layer or residue of flowable product remains in the interstitial space between the cup-opposing portion 52B and the mounting cup 40, the amount or thickness of the flowable product is substantially uniform across the surface of the cup-opposing portion 52B. The components of the BPA container 10 are, moreover, sized and arranged so that only a very small amount of flowable product remains in the interstitial space between the cup-opposing portion 52B and the mounting cup 40 when the piston 24 reaches the distalmost position. Moreover, this amount of flowable product is suitable substantially constant from BPA container to BPA container, when considering slight variations in dimensions from BPA container to BPA container due to manufacturing tolerances.

An annular flange-receiving portion 52C of the crown 52 extends proximally and radially inward from the inner end of the cup-opposing portion 52B. The flange-receiving portion 52C includes a proximally extending segment 52C' that slopes inward from the inner end of cup-opposing portion 52B at a steep proximal angle and an inwardly extending shoulder segment 52C'' that extends radially inward from the proximal end of the proximally extending segment to an inner end of the flange-receiving portion. The flange-receiving portion 52C is sized to substantially correspond to the shape of the segment of the flange portion 44B of the grommet 44 extending inward to the outer side of the disc portion 42B of the valve stem 42. The proximally extending segment 52C' opposes the radially outward facing side of the flange portion 44B, and the shoulder portion 52C'' opposes the proximal facing end of the flange portion.

An annular inner disc-receiving portion 52D of the crown 52 includes a generally cylindrical wall 52D' that extends proximally from the inner end of the flange-receiving portion 52C and a proximal end wall 52D'' extending radially inward from the proximal end of the cylindrical wall. The disc-receiving portion 52D is sized and arranged to receive the disc portion 42B of the valve stem 42 therein. The interior dimensions of the disc-receiving portion 52D of the piston crown 52 are slightly larger than the exterior dimensions of the disc portion 42B of the valve stem 42. Thus, when the piston 52 reaches the distalmost position, a small clearance gap 56 extends between the disc-receiving portion 52D and the disc portion 42B. As explained below, the clearance gap 56 provides space for the product to flow into the open valve 20 after the piston 52 initially engages the distal end of the BPA container 10.

Opening the valve 20 creates a vacuum pressure in the interior volume 22 adjacent the valve opening. In some instances, the vacuum pressure can cause the piston 24 to deform so that a localized portion of the crown 52 engages the valve 20 and/or the conical end cap 12C at the seal interface before the piston 24 reaches the distalmost position (where the entire crown fits in close tolerance with the conical end cap and the valve as described above). Throughout this description, the term "vacuum-induced" is used to describe a localized physical response to vacuum pressure at the valve opening during dispensing. Thus, for example, "vacuum-induced deformation" refers to localized deformation of a portion of the piston 24 that is caused by the vacuum pressure when the piston nears the valve opening. "Vacuum-induced engagement" refers to the engagement caused by the vacuum-induced deformation between the localized portion of the piston 24 and the valve 20 and/or the can 12. As explained below, a "vacuum-induced seal" refers to a seal that is formed between the localized portion of the piston 24 and the valve 20 and/or the can 12 as a result of the vacuum-induced engagement.

In the illustrated embodiment, the vacuum-induced deformation can cause the flange receiving portion 52C of the crown 52 to engage the flange portion 44B of the grommet 44 before the piston 24 reaches the distalmost position. This vacuum-induced engagement creates the interface seal at the interface between the crown 52 and the flange portion 44B that restricts the flow of product into the valve opening. More specifically, if a vacuum-induced seal is formed between the flange receiving portion 52C of the crown 52 and the valve 20, the interface seal prevents the flowable product located radially outward of the seal (e.g., in the interstitial space between the shoulder portion 52A of the crown and the conical end cap 12C and the cup-opposing portion 52B of the crown and the mounting cup 40) from flowing into the valve opening. As a result, excess, residual product remains in the interior volume 22 after dispensing is complete.

Conventionally, the deforming effect of the vacuum pressure on the piston 24 may be unpredictable, so the amount of excess product that remains in the interior volume 22 due to the vacuum-induced sealing varies from one BPA container to the next. Thus, in order to comply with weights and measure regulations that require every BPA container 10 sold to dispense a predetermined minimum amount of product, the BPA containers 10 must be overfilled. Overfilling ensures that even the units that ultimately dispense the least amount of product (e.g., due to early formation of a vacuum-induced seal) are capable of dispensing a minimum predetermined volume of product (e.g., an advertised volume). Since each BPA container is typically filled with the same amount of product, the BPA containers that ultimately dispense a greater amount of product are filled with more product than is required to comply with weights and measures regulations.

In order to prevent the vacuum-induced deformation of the piston 24 from forming a vacuum-induced seal at the interface, the illustrated BPA container 10 defines one or more product flow passages at (e.g., that extend through) the interface between the portion of the piston that is deformed by the vacuum pressure and the valve 20. Even after vacuum-induced engagement occurs, the product flow passages fluidly couple residual product in the interior volume 22 to the valve opening. In the illustrated embodiment, a plurality of circumferentially spaced apart grooves 60 are formed in the crown 52 to define the product flow passages. The flow passages are arranged annularly about the imaginary axis LA of the can. It will be appreciated that grooves may also be formed in the valve or can to define the flow passages in other embodiments. Furthermore, as explained below, the BPA container can also define the product flow passages using other structures in other embodiments. In the illustrated embodiment, the grooves 64 are formed in the flange-receiving portion 52C of the crown 52 because the vacuum-induced engagement between the piston 24 and the valve 20 (i.e., sealing interface) occurs at that location. It will be understood that, in other embodiments, the configuration of the BPA container may cause vacuum-induced engagement at another portion of the piston, and thus the product flow passages may suitably be formed in at other locations in other embodiments.

Figure 5B:
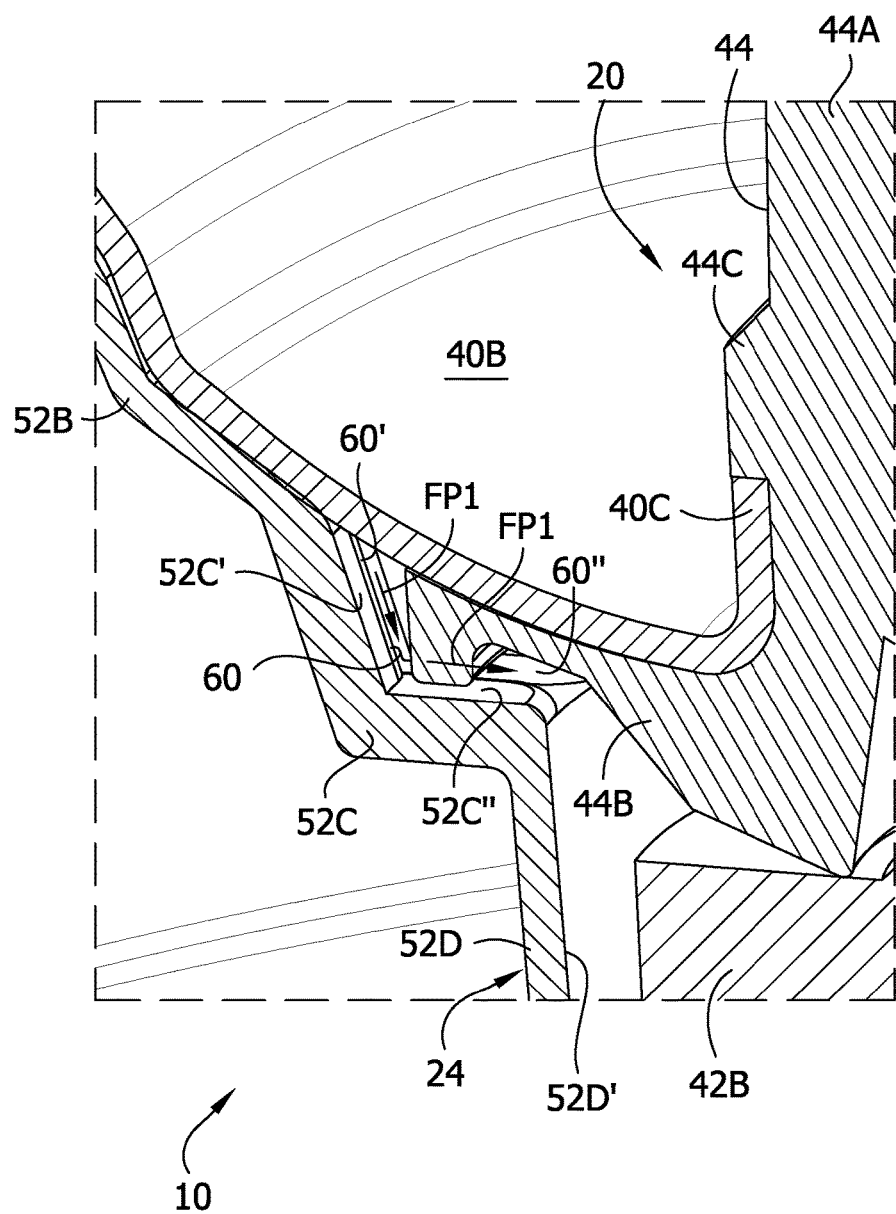
FIG. 5B is an enlarged perspective of the cross section shown in FIG. 5, illustrating a product flow passage formed at an interface between a valve of the BPA container and the piston.

As shown in FIG. 7, radially extending grooves 60 are formed in the flange-receiving portion 52C of the crown 52 at eight circumferentially spaced apart locations. Other embodiments can include other numbers and arrangements of grooves. Each groove 60 includes a proximally extending segment 60' extending along the proximally extending segment 52C' of the flange-receiving portion 52C and an inwardly extending segment 60" extending along the inwardly extending shoulder segment 52C". As shown in FIG. 5B, when the flange-receiving portion 52C of the crown 52 is drawn into vacuum-induced engagement with the valve 20, the grooves 60 define product flow passages that channel the product along a flow path FP1 through the interface toward the valve opening. The flowable product flows along the flow path FP1 through the proximally extending segment 60' at a steep proximal slope. The flow path FP1 continues radially inwardly through the inward extending segment 60". Finally, the product flows through the clearance gap 56 into the valve opening. The grooves 60 thus convey product located radially outward of the vacuum-induced engagement between the piston 24 and the valve 20 to the valve opening for dispensing.

Figure 8:
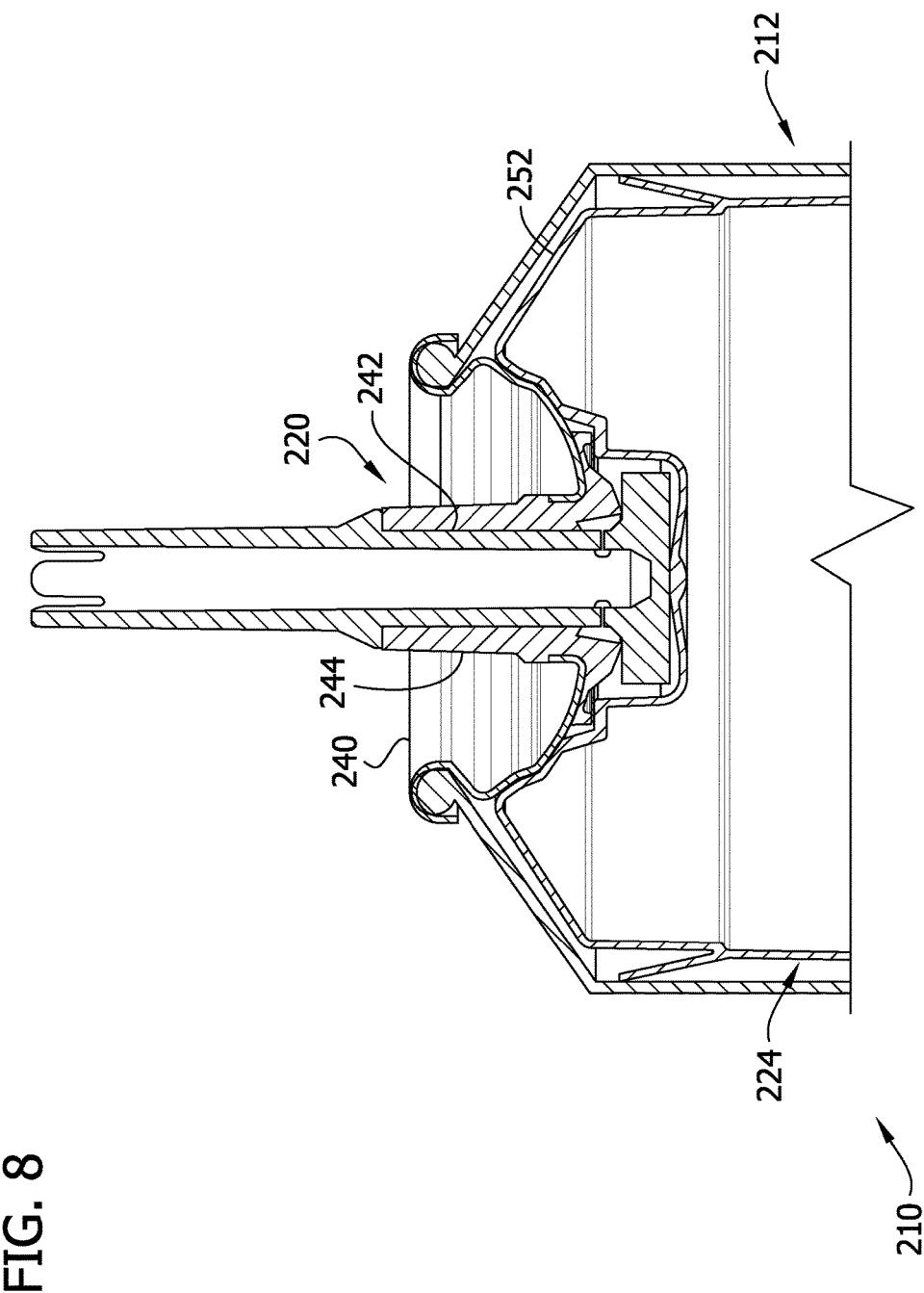
FIG. 8 is an enlarged cross section of another embodiment of a BPA container.
Figure 9:
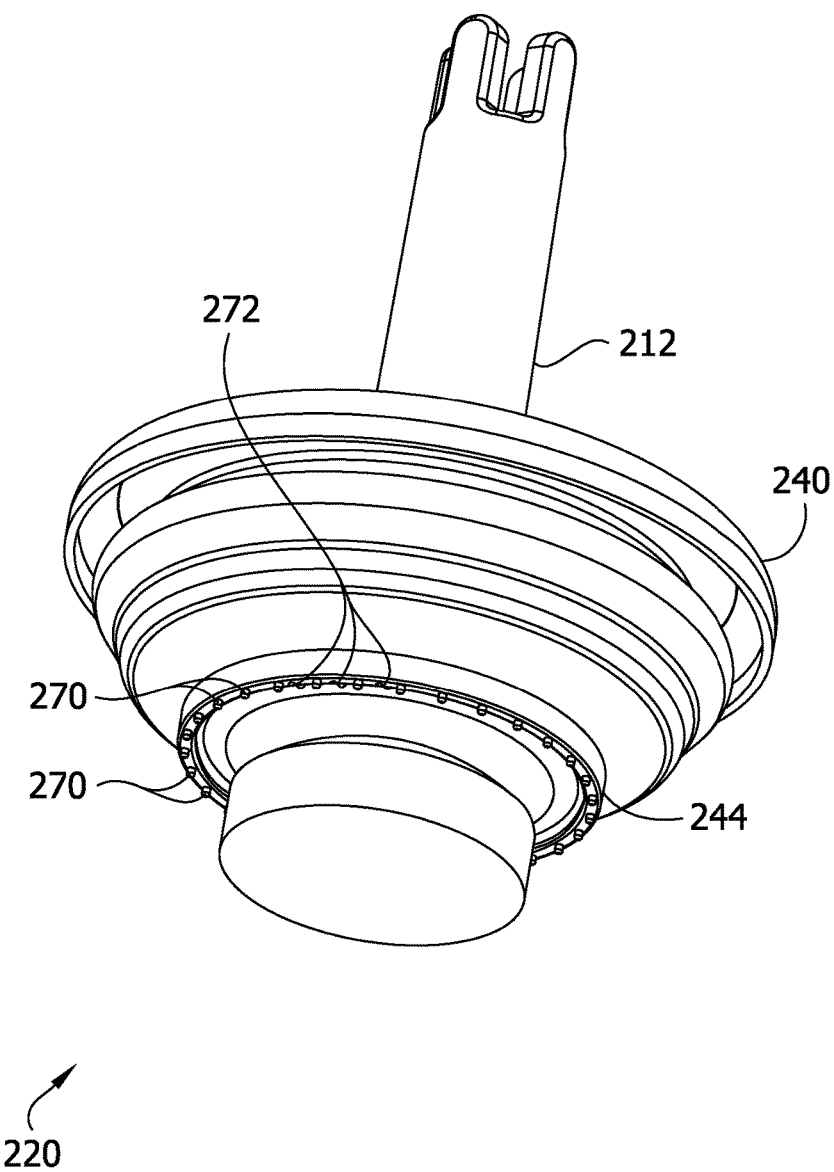
FIG. 9 is a perspective of a valve of the BPA container of FIG. 8.
Figure 10:
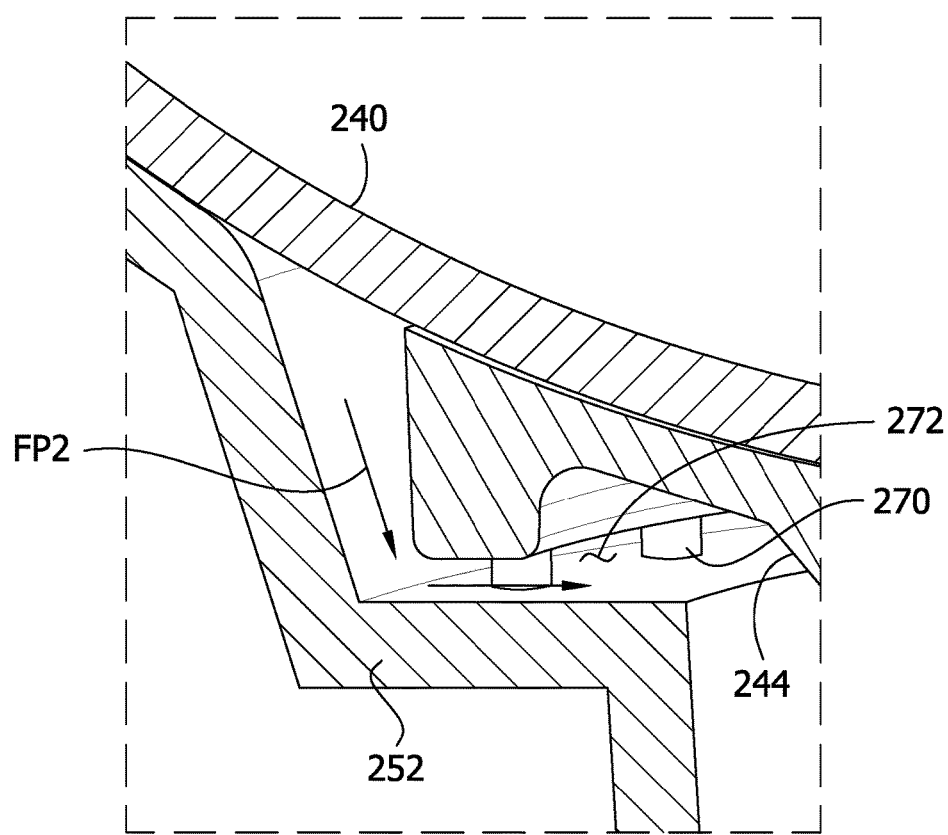
FIG. 10 is an enlarged perspective of the cross section shown in FIG. 8, illustrating a product flow passage formed in an interface between the valve and a piston of the BPA container.

Referring to FIGS. 8-10, another embodiment of a BPA container, generally indicated at 210, includes a can, generally indicated at 212, a valve generally indicated at 220, and a piston generally indicated at 224. Other than the differences described below, the can 212, the valve 220, and the piston 224 are substantially identical to the can 12, the valve 20, and the piston 24 of the BPA container 10 described above. The valve 220 includes a cup 240 that is crimped onto the can 210, a grommet 244 that is sealingly received in the cup, and a valve stem 242 that extends through the seal and is operative to open the valve when tilted or depressed axially relative to the seal. The piston 224 is slidably received in the can 212 to slide distally through the interior of the can when the valve 220 is opened. As the piston 224 slides through the can 212, it dispenses flowable product through the valve opening. Like the piston 24, the piston 224 includes a crown 252 that is shaped and arranged to correspond in shape to the distal end of the BPA container 210 to fit in close tolerance with the distal end of the can 212 and the valve 220 when it reaches the distalmost position. However, unlike the piston 24, the crown 252 lacks grooves for defining a product conveying passage through the interface between the piston 224 and the valve 220.

Instead of grooves formed in the piston 224, the illustrated BPA container 210 includes a plurality of bosses or projections 270 that extend from the grommet 244 to define channels 272 therebetween. The illustrated projections 270 extend proximally from the flange portion of the grommet 244 at circumferentially spaced apart positions as shown in FIG. 9. The channels 272 are positioned between adjacent projections and extend inward in generally radial directions. In other embodiments, other arrangements of projections may be used to define the channels. For example, the projections may extend radially outward and/or extend from another component of the valve, such as the cup or the disc of the stem. Likewise, the projections may be formed on the piston instead or in addition to the valve.

As explained above, when the valve 220 is opened, it can create a vacuum pressure that deforms the piston 224 to cause engagement between the crown 252 and the valve. When this occurs, the projections 270 engage the crown 252 and the channels 272 form product flow passages through the interface between the valve 220 and the piston 224. The product flows through the flow passages formed by the channels 272 along the flow path FP2 (FIG. 10) into the valve opening. Thus, like the BPA container 10 discussed above, BPA containers 210 can consistently dispense all but a small, predetermined residual amount of the flowable product.

Figure 11:
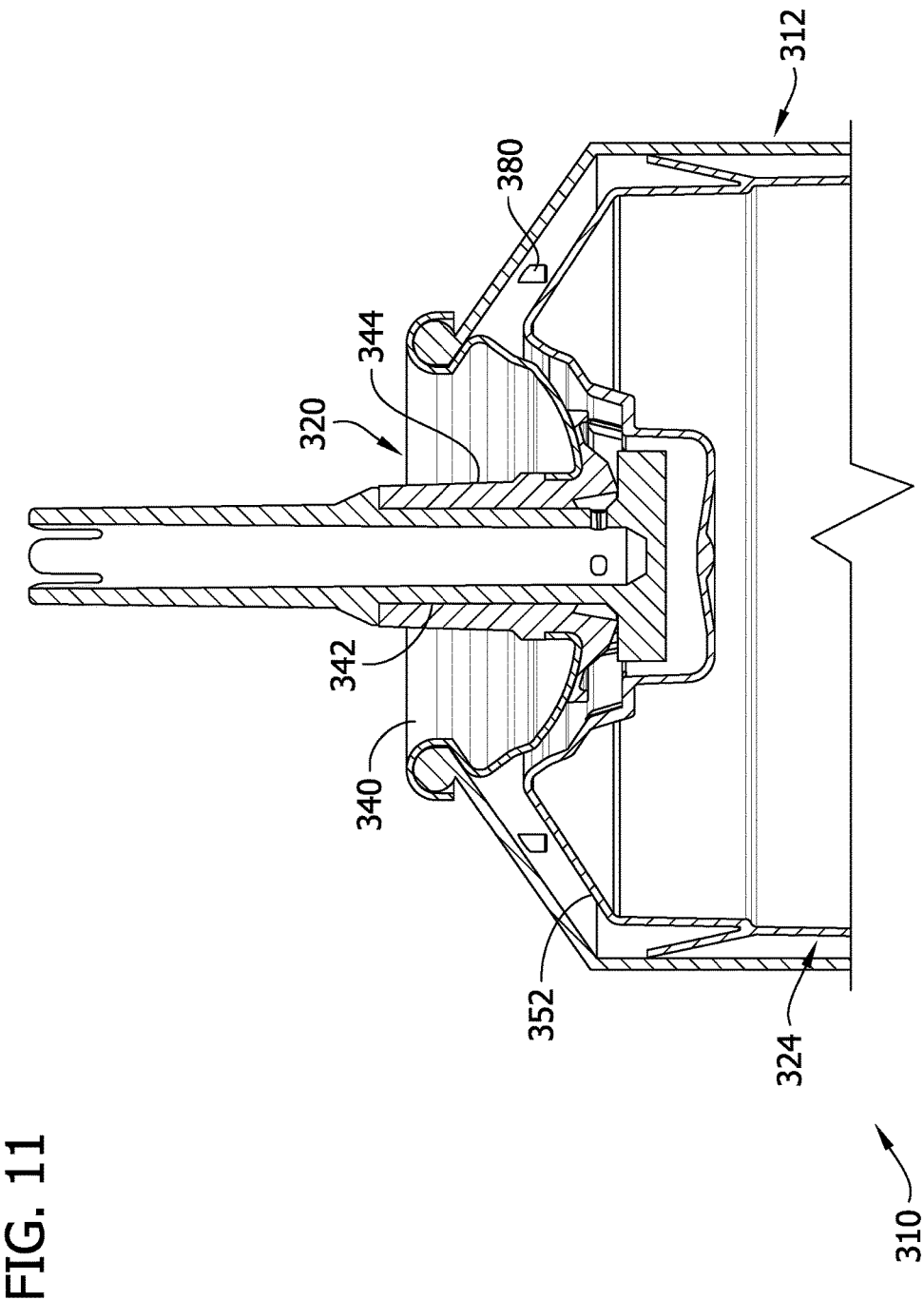
FIG. 11 is an enlarged cross section of another embodiment of a BPA container.
Figure 12:
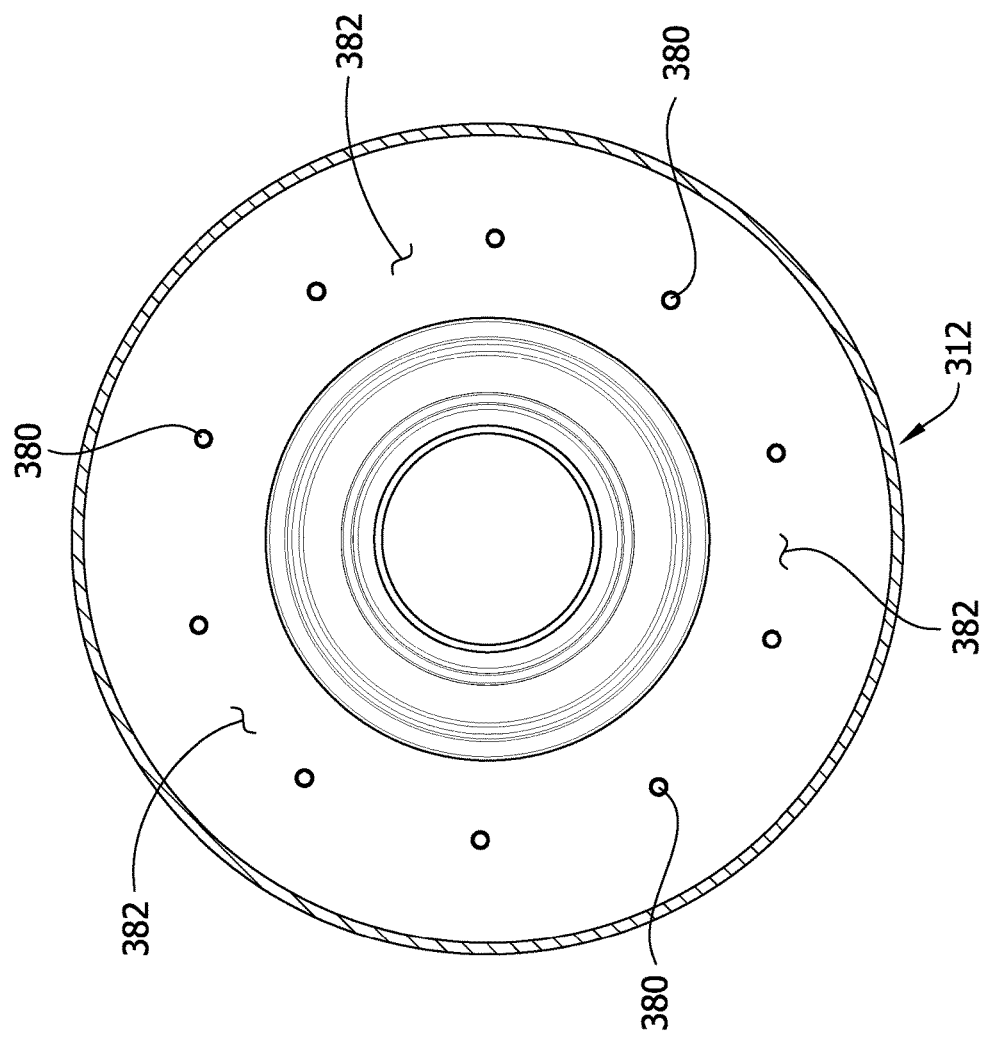
FIG. 12 is a cross section of a can of the BPA container of FIG. 11.
Figure 13:
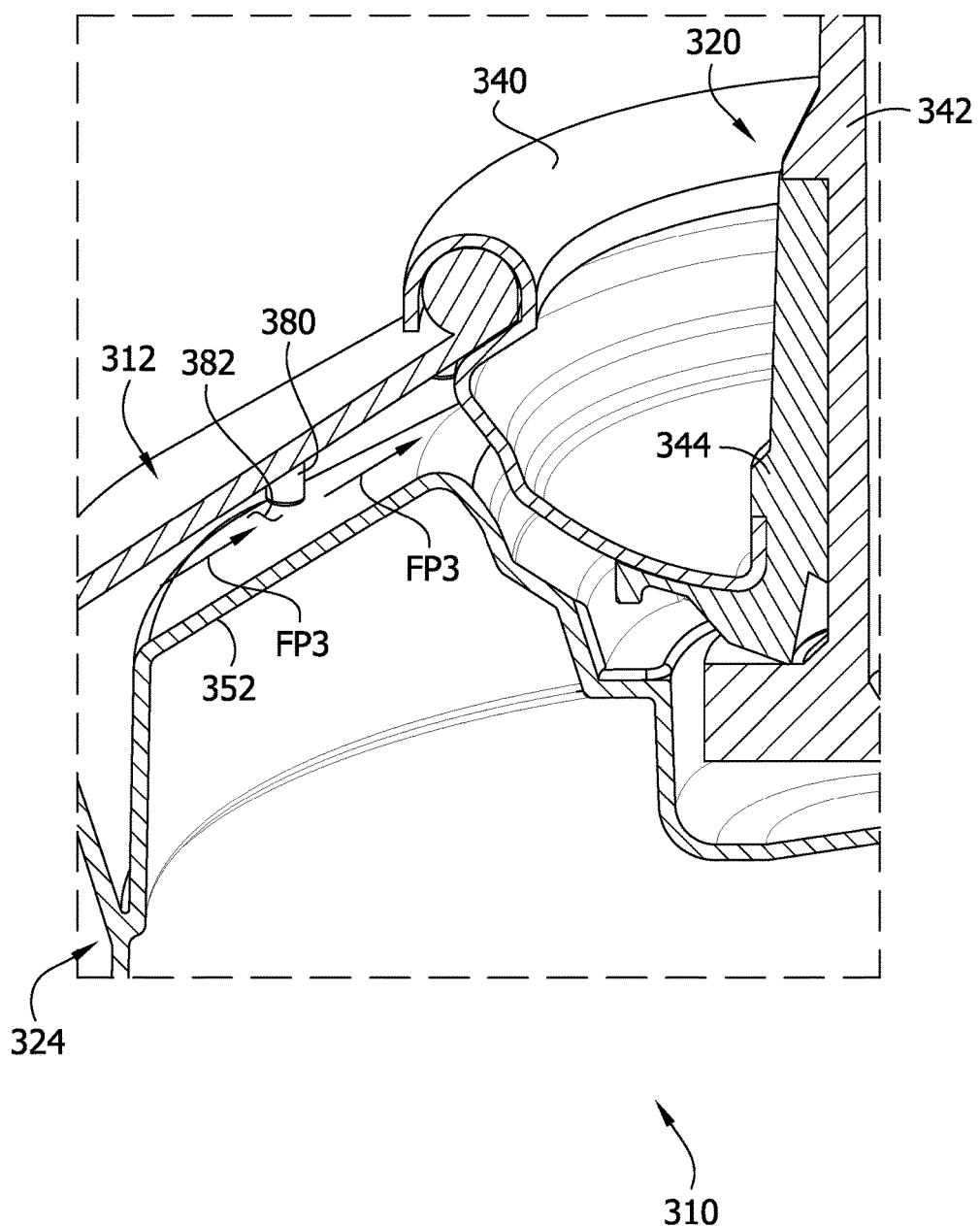
FIG. 13 is an enlarged perspective of the cross section shown in FIG. 11, illustrating a product flow passage formed in an interface between the can and a piston of the BPA container.

Referring to FIGS. 11-13, another embodiment of a BPA container, generally indicated at 310, includes a can, generally indicated at 312, a valve generally indicated at 320, and a piston generally indicated at 324. Other than the differences described below, the can 312, the valve 320, and the piston 324 are substantially identical to the can 12, the valve 20, and the piston 24 of the BPA container 10 described above. The valve 320 includes a cup 340 that is crimped onto the can, a grommet 344 that is sealingly received in the cup, and a valve stem 342 that extends through the grommet and is operative to open the valve when tilted or depressed axially relative to the grommet. The piston 324 is slidably received in the can 312 to slide distally through the can when the valve 320 is opened. Like the piston 24, the piston 324 includes a crown 352 that is shaped and arranged to correspond in shape to the distal end of the BPA container 310 in order to fit in close tolerance with the distal end of the can 312 and the valve 320 when it reaches the distalmost position. However, unlike the piston 24, the crown 352 lacks grooves for conveying the product through the interface seal between the piston 324 and the valve 320.

Instead of grooves formed in the piston 324, the illustrated BPA container 310 includes a plurality of bosses or projections 380 that extend proximally from the conical distal end of the can 312 to define channels 282 (i.e., flow passages) therebetween. The illustrated projections 380 extend proximally from the conical end of the can 312 at circumferentially spaced apart positions as shown in FIG. 12. The channels 382 are located between adjacent projections 380 and extend inward in a generally radial direction. In other embodiments, other arrangements of projections formed on the can may be used to define channels.

As explained above, when the valve 320 is opened, it can create a vacuum pressure that deforms the piston 324 to create a seal that restricts the flow of some of the product into the valve opening. However, the projections 380 engage the crown 352 before the piston 324 reaches a position in which the vacuum pressure can create a vacuum-induced seal. That is, the projections 380 engage the crown 352 to define a distalmost position of the piston 324 in which the crown is spaced apart from the valve 320 and the conical distal end of the can 312 by a sufficient distance so that the piston cannot form a vacuum-induced seal that restricts the flow of the product into the valve opening. The product can freely flow through the channels 382 between the projections 380 along the flow path FP3 (FIG. 13) into the valve opening. Thus, like the BPA container 10 discussed above, BPA containers 310 can consistently dispense all but a small, predetermined residual amount of the flowable product.

Accordingly, it can be seen that a BPA container can be shaped and arranged to define flow passages for flowable product at the interface seal between a piston and a valve or a piston and the distal end of a can that prevent vacuum pressure at the valve opening from creating a seal that restricts the flow of product to the valve opening. As a result, the amount of product dispensed from each BPA container can be maximized. In addition, variance in the amount of product dispensed from plural BPA containers can be minimized, which allows filling with minimal overfill while still complying with weights and measures regulations. Although the illustrated embodiments use a plurality of identical formations formed on one of the piston, the valve, and the can to create the flow passages, other embodiments can use only a single passage-forming formation, a plurality of passage-forming formations of different types, shapes, and/or sizes, and/or passage-forming formations formed on more than one of the piston, the valve, and the can.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A barrier package aerosol container for dispensing a flowable product, comprising:
   a can having opposite top and bottom ends and an interior surface defining an interior volume;
   a valve secured to the top end of the can, the valve defining a valve inlet that is selectively openable to dispense the flowable product from the can; and
   a piston disposed in the interior volume of the can, wherein the piston is movable toward the top end of the can to facilitate dispensing of the flowable material,
   wherein opposing surfaces of the piston and the can and the valve define an interstitial space of the interior volume in which the flowable product is receivable,
   wherein the piston is configured to contact the valve to define a piston interface when the piston is at the top end of the can during use, the piston interface including a first piston interface disposed at the contact between the piston and the valve at a first contact location and a second piston interface disposed as the contact between the piston and the valve at a second contact location,
   wherein at least one of: i) the piston, and ii) the valve defines one or more flow passages at the piston interface to allow flowable material in the interstitial space to flow past the piston interface toward the valve inlet during use, wherein at least one of the one or more flow passages is disposed between the first and second piston interfaces to allow the flowable material in the interstitial space to flow past the first and second contact locations between the piston and the valve and toward the valve inlet.

2. The barrier package aerosol container as set forth in claim 1, wherein the can has an imaginary axis extending through the top and bottom ends, wherein said one or more flow passages extend generally radially relative to the longitudinal axis of the can.

3. The barrier package aerosol container as set forth in claim 2, wherein said one or more flow passages comprises a plurality of flow passages.

4. The barrier package aerosol container as set forth in claim 3, wherein the plurality of flow passages are arranged annularly about the imaginary axis of the can.

5. The barrier package aerosol container as set forth in claim 4, wherein the piston defines the plurality of flow passages.

6. The barrier package aerosol container as set forth in claim 5, wherein the valve includes a grommet having a flange, wherein the piston is configured to contact the flange of the grommet to define the piston interface when the piston is at the top end of the can during use.

7. The barrier package aerosol container as set forth in claim 6, wherein the plurality of flow passages are defined by grooves in the piston.

8. The barrier package aerosol container set forth in claim 4, wherein the plurality of flow passages includes at least eight flow passages.

9. The barrier package aerosol container as set forth in claim 1, wherein the valve defines said one or more flow passages.

10. The barrier package aerosol container as set forth in claim 1, wherein the piston includes a crown defining a cavity sized and shaped to receive the valve when the piston is at the top end of the can during use.

11. The barrier package aerosol container as set forth in claim 10, wherein the crown includes a distal surface configured to generally nest with the top end of the can and the valve, the distal surface defining the cavity, and
wherein each of the one or more flow passages is defined by a groove on the distal surface of the crown and disposed in the cavity.

12. The barrier package aerosol container set forth in claim 11, wherein the piston includes an annular skirt extending proximally from the crown.

13. The barrier package aerosol container set forth in claim 11, wherein the one or more flow passages comprises a plurality of flow passages.

14. The barrier package aerosol container set forth in claim 13, wherein the piston has an imaginary axis, wherein the plurality of flow passages are spaced apart from one another about the imaginary axis.

15. The barrier package aerosol container set forth in claim 14, wherein each groove defining one of the plurality of flow passages includes a first groove segment and a second groove segment, the first groove segment extending generally distally from an end of the second groove segment, and the second groove segment extending in a direction that is generally perpendicular to the imaginary axis from an end of the first groove segment.

16. The barrier package aerosol container set forth in claim 11, wherein the piston further includes a sealing structure adjacent the crown configured to sealingly engage the can to form a fluid tight seal between the piston and the can.

17. The barrier package aerosol container set forth in claim 1, wherein the valve includes a mounting cup and a grommet, the piston interface being disposed at and defined by the contact between the piston and at least one of: i) the mounting cup, and ii) the grommet of the valve.

18. The barrier package aerosol container set forth in claim 17, wherein the piston interface is disposed at and defined by the contact between the piston and the mounting cup.

19. The barrier package aerosol container set forth in claim 17, wherein the piston interface is disposed at and defined by the contact between the piston and the grommet.

20. The barrier package aerosol container set forth in claim 19, wherein the grommet defines the one or more flow passages.

\* \* \* \* \*